(12) United States Patent
Kurihara et al.

(10) Patent No.: US 6,476,797 B1
(45) Date of Patent: Nov. 5, 2002

(54) DISPLAY

(75) Inventors: Mikio Kurihara, Yamato (JP); Satoshi Karube, Kamakura (JP); Eisuke Kanzaki, Fujisawa (JP)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 09/557,606

(22) Filed: Apr. 25, 2000

(30) Foreign Application Priority Data

Apr. 27, 1999 (JP) ............................................ 11-118989

(51) Int. Cl.[7] ................................................. G09G 5/00
(52) U.S. Cl. ....................................................... 345/173
(58) Field of Search ................................ 382/119, 124; 345/173, 175, 178, 18.01, 211, 212, 213

(56) References Cited

U.S. PATENT DOCUMENTS

| | | | | |
|---|---|---|---|---|
| 4,703,511 A | * | 10/1987 | Conoval ...................... | 382/182 |
| 5,420,936 A | * | 5/1995 | Fitzpatrick et al. ......... | 382/124 |
| 5,559,961 A | * | 9/1996 | Blonder ....................... | 713/202 |
| 5,929,834 A | * | 7/1999 | Inoue et al. ................. | 345/104 |
| 6,137,481 A | * | 10/2000 | Phillipps ..................... | 345/173 |

* cited by examiner

*Primary Examiner*—Amare Mengistu
*Assistant Examiner*—Tom V. Sheng
(74) *Attorney, Agent, or Firm*—Gail H. Zarick; Anne Vachon Dougherty

(57) ABSTRACT

A display 2 comprises a display area, and at least one touch switch region 6 formed in the display area and to be driven by an independent power supply, wherein the touch switch region 6 is operated with a predetermined input, whereby predetermined functions are controlled. Preferably, the input for controlling the predetermined function is provided by a touch of one touch switch region 6 or a simultaneous touch of a plurality of touch switch regions 6 once or a plurality of times in a predetermined order. Alternatively, the touch switch region 6 is provided with an image read function, and at the time of the predetermined input, fingerprint authentication is performed simultaneously with the touch of the touch switch region. Alternatively, a window is displayed on the touch panel simultaneously with the touch of the touch switch region, a signature is written on the displayed window, and then signature authentication is performed.

20 Claims, 5 Drawing Sheets

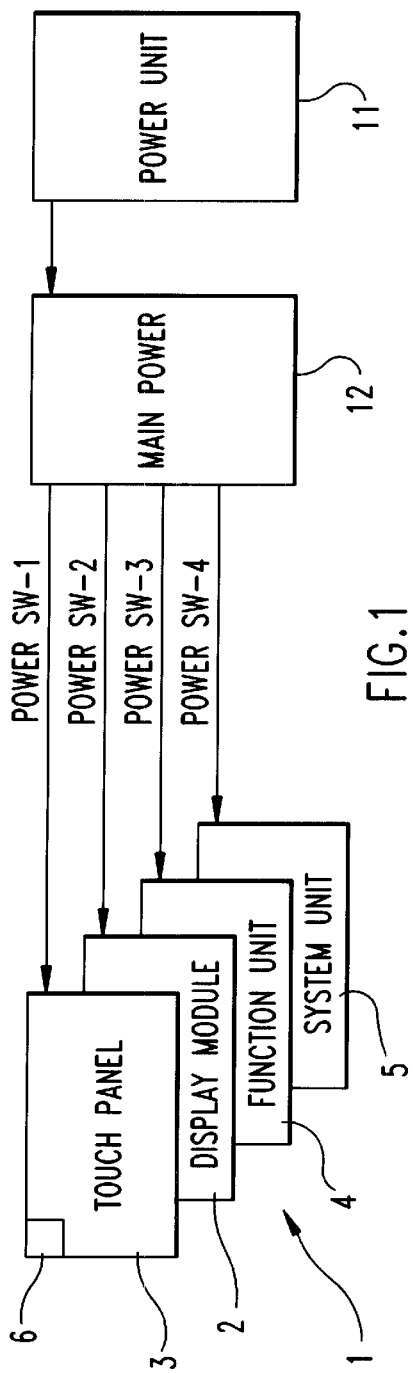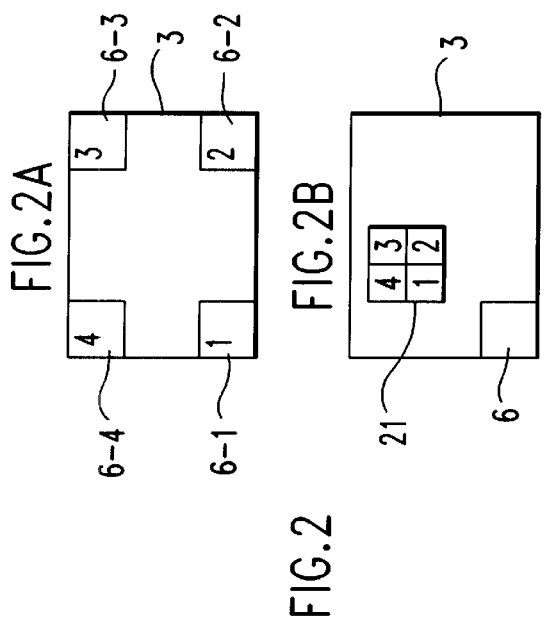

FIG. 3
FIG. 3A
NORMAL USE STATE
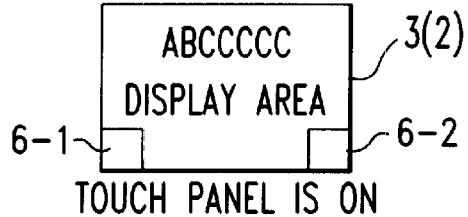
TOUCH PANEL IS ON
↓
WHEN USER DOES NOT WANT TO USE TOUCH PANEL
FIG. 3B
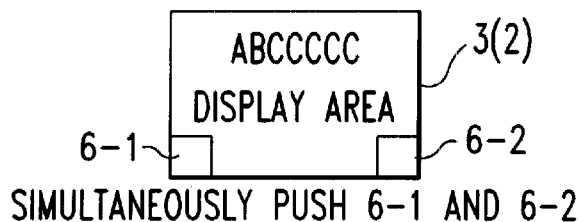
SIMULTANEOUSLY PUSH 6-1 AND 6-2
↓
STATE IN WHICH TOUCH PANEL IS OFF
FIG. 3C
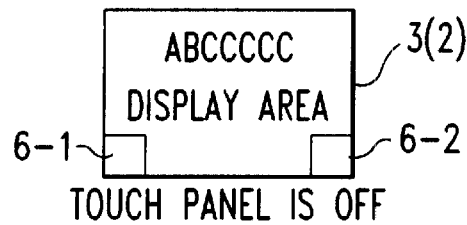
TOUCH PANEL IS OFF
↓
WHEN USER WANTS TO USE TOUCH FUNCTION
FIG. 3D
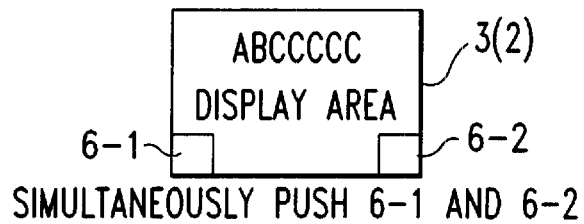
SIMULTANEOUSLY PUSH 6-1 AND 6-2
↓
STATE IN WHICH TOUCH PANEL IS ON
FIG. 3E
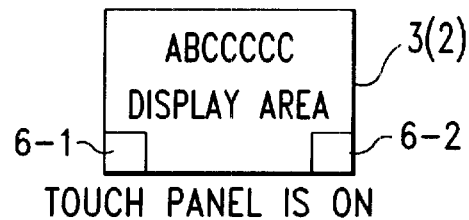
TOUCH PANEL IS ON FIG. 4
FIG. 4A
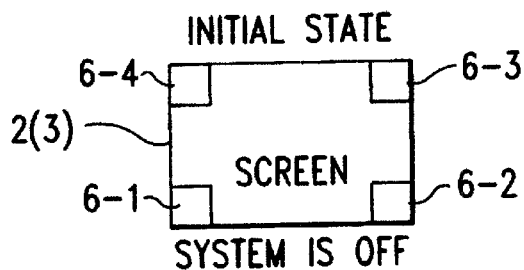
FIG. 4B
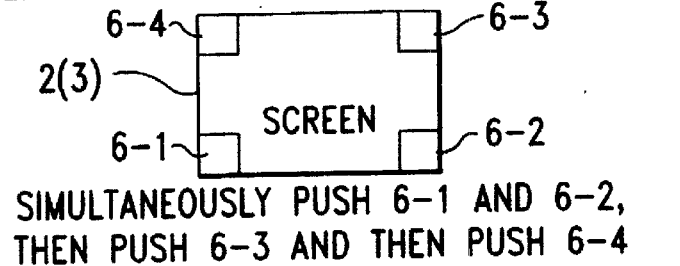
FIG. 4C
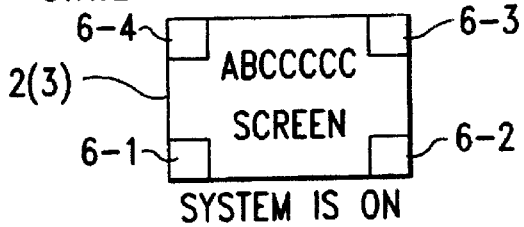
FIG. 4D
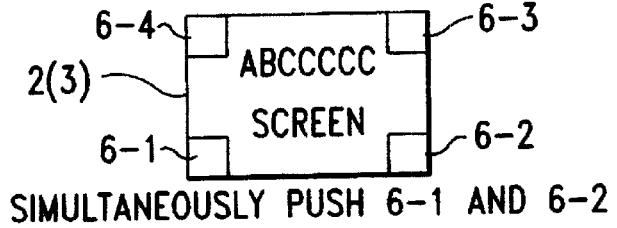
FIG. 4E
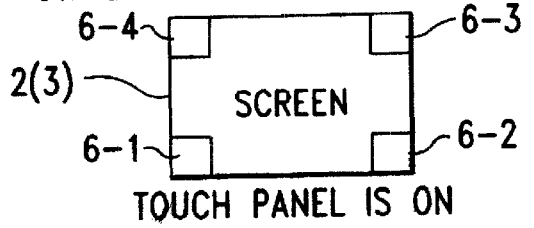

FIG.5A
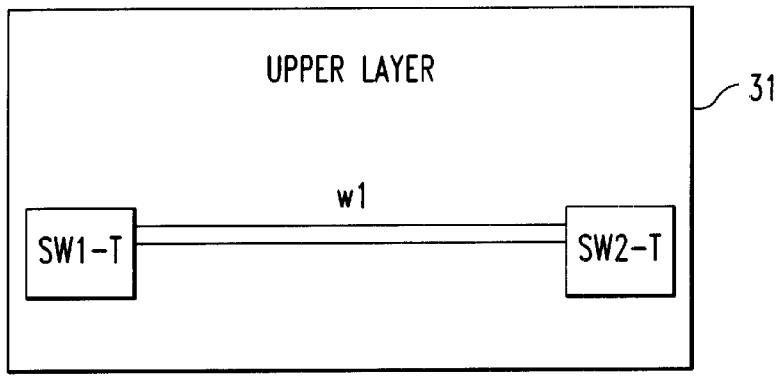
FIG.5B
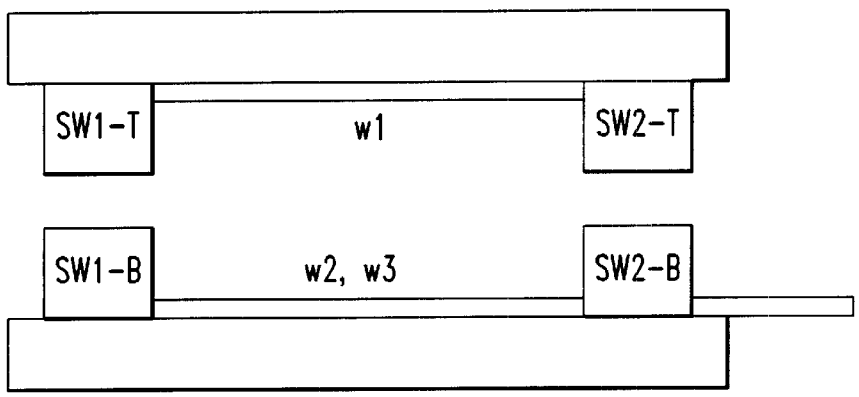
FIG.5C
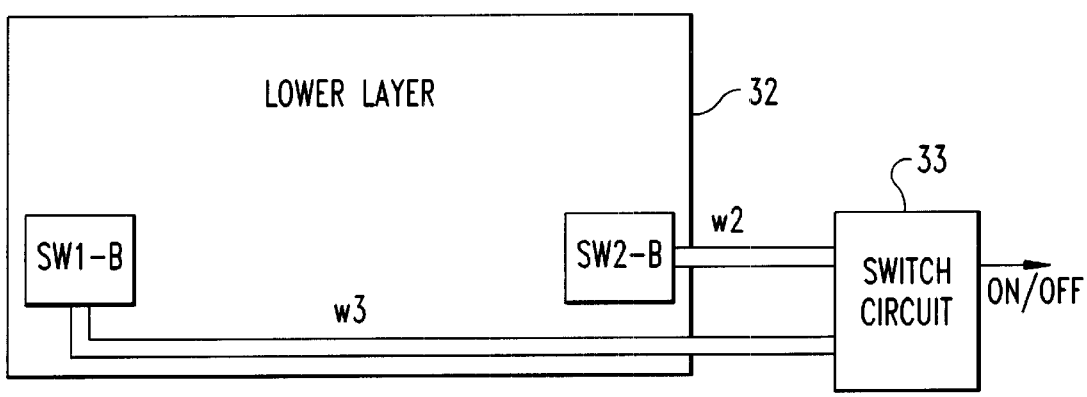
FIG.5

DISPLAY

FIELD OF THE INVENTION

The present invention relates to a display including a display module such as an LCD (Liquid Crystal Display) or a CRT (Cathode-Ray Tube) and more particularly to a display capable of controlling various functions by operating a display area of the display.

BACKGROUND OF THE INVENTION

Various displays including the display module such as the LCD or the CRT have been heretofore known. Various displays having an input function using a touch panel overlaid on the display area of the display module have been also known. Such a display controls the function of turning on or off a main power switch, for example, in the following manner. The switch displayed on the display area of the display module is clicked and pointed at with a pointing device. The display including the touch panel controls the functions in the following manner. The switch displayed on the touch panel is pointed at with a touch of the finger or the like.

The above-described control of the functions cannot be executed when a power supply of the display module or the touch panel is not on. It is thus necessary to always keep the power supply of the display module or the touch panel on. Power consumption is therefore increased. Especially when the display is used for a mobile terminal such as a notebook PC, available time is reduced proportional to the time period for which the display is carried. The available time is extremely important for the use in the mobile terminal. A serious problem is that the available time is thus reduced. Moreover, a recent requirement is that the power consumption while in standby mode be reduced to a minimum level or to zero from an environmental standpoint.

Various techniques are known in order to solve the above-described problem of the available time, i.e., the problem of power saving. One technique is disclosed in Japanese Unexamined Patent Publication No. 63-276085 in which a proximity sensor is provided on the touch panel. In the system disclosed in that publication, the power supply of the touch panel is turned on when a person approaches the sensor for the purpose of operation or the like and thus the proximity sensor generates a sense signal. Conversely, the power supply of the touch panel is turned off when a sense signal is not generated. Another technique is disclosed in Japanese Examined Patent Publication No. 3-19566 in which a push button switch is provided on the touch panel. Under that system, the push button switch is turned on by touching the touch panel with the finger or the like; and, the touch panel is turned on only at this time, whereby the power consumption is reduced.

However, the above-mentioned techniques cannot fully achieve the desired power saving. Thus, a problem exists whereby it is impossible to provide a display which is capable of achieving the sufficient power saving that is increasingly required and which is capable of increasing the available time of the display. Another problem which exists is that, even if the power saving can be achieved to some extent, the problem of security is not considered at all when the function is executed. Thus, even an ill-intentioned third party can easily perform the on-off control of the display under the prior art systems.

It is, therefore, an object of the present invention to provide a display which can achieve functions such as power saving for various units by a simple constitution and which can also maintain security.

SUMMARY OF THE INVENTION

The foregoing and other objects are realized by the present invention for use with a display including a display module such as an LCD or a CRT, and preferably for a display having an input function using a touch panel overlaid on a display area. The display comprises a display area and at least one touch switch region formed in the display area, which touch switch region is driven by an independent power supply. Preferably, the touch switch region may be formed by providing a small touch panel at a predetermined position of the display area of the display. In the display including the touch panel, preferably the touch switch region may be formed by overlaying another touch panel on a surface of the main touch panel, or by separating a part of the touch panel from the main touch panel. Then, the touch switch region is operated with a predetermined input, whereby predetermined functions are controlled.

When not much consideration is given to security, the predetermined input can be provided simply by touching one touch switch region. When security is a consideration, however, the predetermined input can be provided by a touch of one specific touch switch region, or by simultaneous touching of a plurality of touch switch regions once or a plurality of times in a predetermined order. Moreover, the touch switch region is provided with an image read function and, at the time of the predetermined input, fingerprint authentication can be performed simultaneously with the touch of the touch switch region. Alternatively, a window is displayed on the touch panel simultaneously with the touch of the touch switch region, a signature is written on the displayed window, and then signature authentication can be performed.

Furthermore, predetermined functions to be controlled include on-off control of a main power switch, on-off control of a display module of the display, on-off control of a function unit, on-off control of a system unit, or on-off control of the touch panel if the display has the touch panel. The function unit is a fingerprint authentication unit or a signature authentication unit. The system unit is a system power switch or a system suspend/resume switch.

In the present invention, normally, at least one touch switch region which is alone to be driven by the independent power supply can be always kept driven, and the power supplies of all the other functions can be kept off. Only when a user wants to control a predetermined function is the power supply of a predetermined function turned on and controlled with the touch of the touch switch region. Therefore, sufficient power saving can be achieved. Moreover, (1) the input for controlling a predetermined function is provided by the touch of one touch switch region or the simultaneous touch of a plurality of touch switch regions once or a plurality of times in a predetermined order; (2) the touch switch region is provided with the image read function, and at the time of a predetermined input operation, fingerprint authentication is performed simultaneously with the touch of the touch switch region; or (3) the window is displayed on the touch panel simultaneously with the touch of the touch switch region, the signature is written on the displayed window, and signature authentication is performed. Due to any one of the above (1) to (3), a third party who does not know an input order or has an unauthorized fingerprint or signature cannot use the function. Thus, security can be maintained.

BRIEF DESCRIPTION OF THE DRAWINGS

The invention will now be described in greater detail with specific reference to the appended drawings wherein:

FIG. 1 is a schematic illustration of a system of one example of a display of the present invention;

FIGS. 2A and 2B show constitutions of examples of a touch switch region of the display of the present invention;

FIGS. 3A to 3E show the states of a panel power saving function of the present invention;

FIGS. 4A to 4E show the states of a combination key switch of a security function of the present invention;

FIGS. 5A, 5B and 5C are a top view, a side view and a bottom view, respectively, of the constitution of one example of the touch switch region formed on the surface of a display module or a touch panel, respectively.

DETAILED DESCRIPTION OF THE INVENTION

Figure 6:
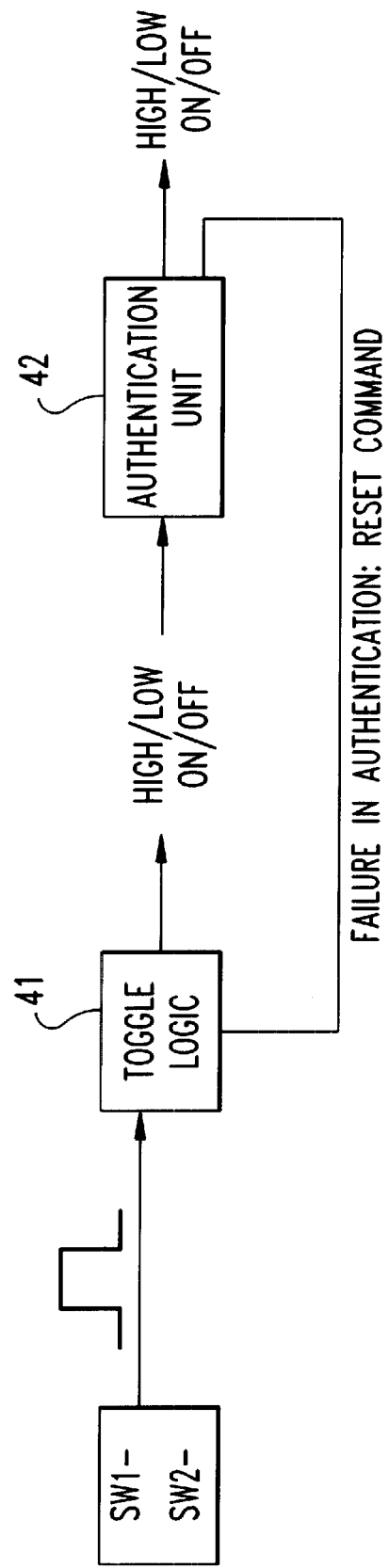
FIG. 6 shows the example of switching of the touch switch region using a switch which needs to be powered.

FIG. 1 is a schematic illustration of a system of one example of a display of the present invention. In the example shown in FIG. 1, numeral 1 denotes the display, numeral 11 denotes a power unit, and numeral 12 denotes a main power switch SW-0. The display 1 includes a display module 2 and a touch panel 3 overlaid on a display area of the display module 2, thereby having an input function using the touch panel. The display 1 also includes a function unit 4 and a system unit 5. In this example, a different transparent touch panel (not shown) from the touch panel 3 is overlaid on a predetermined position of the touch panel 3, whereby at least one touch switch region 6 to be driven by an independent power supply is formed in the display area of the display 1, i.e., the display area of the touch panel 3 (it is here assumed that one touch switch region is located at an upper left corner). Functions of the function unit 4 include a fingerprint authentication function and a signature authentication function as described below. Functions of the system unit 5 include a system power switch function and a system suspend/resume switch function.

In the example shown in FIG. 1, the display of the present invention is characterized by that the touch switch region 6 is operated with a predetermined input as described below, whereby the display executes the on-off control of the switch SW-0 of the main power switch 12, the on-off control of a power switch SW-1 from the power unit 11 to the touch panel 3, the on-off control of a power switch SW-2 from the power unit 11 to the display module 2, the on-off control of a power switch SW-3 from the power unit 11 to the function unit 4, or the on-off control of a power switch SW-4 from the power unit 11 to the system unit 5. In this case, the power for driving the touch switch region 6 is always supplied to the touch switch region 6. Moreover, users individually set an input operation.

FIGS. 2A and 2B show constitutions of examples of the touch switch region 6 of the display of the present invention. In the example shown in FIG. 2A, touch switch regions 6-1 to 6-4 are located at four corners of the display area of the touch panel 3. In this example, the input operation is performed in the following manner. The user previously memorizes the positions of the invisible touch switch regions 6-1 to 6-4, and the user touches the touch switch regions 6-1 to 6-4 in a predetermined order with his/her fingertip, for example. In the example shown in FIG. 2B, the touch switch region 6 is located at a lower left corner of the display area of the touch panel 3. In this example, the input operation is performed in the following manner. The user previously memorizes the position of the invisible touch switch region 6. Then, the user touches the touch switch region 6 with his/her fingertip, for example, whereby a visible keying section 21 (here, four numbers, i.e., 1 to 4) is displayed near the center of the touch panel 3 by the display module 2. Then, the user touches the numbers of the keying section 21 with his/her fingertip, for instance. The description of FIG. 1 gives the example that the touch switch region 6 is formed by overlaying a different touch panel from the touch panel 3 on a predetermined position of the touch panel 3. However, the touch switch region 6 can be also formed by separating a part of the touch panel 3 from the touch panel 3 at the time of making of the touch panel 3.

Next, the functions which can be carried out by the display of the present invention, i.e., a power saving function for the touch panel 3 and the display module 2, a security function, a system switch function and an S/W key function will be described in order.

1) Panel Power Saving Function

To save the power when the touch panel 3 and/or the display module 2 are/is not in use, the power switch SW-1 to the touch panel 3 and/or the power switch SW-2 to the display module 2 shown in FIG. 1 are/is repeatedly turned on and off only when the touch switch regions 6-1 and 6-2 of the example shown in FIG. 2A are simultaneously touched and pushed, for example. Thus, the power saving for the touch panel 3 and/or the display module 2 can be executed.

2) Security Function

To prevent others from using the system without authorization, the switch for confirming the identity of the user is used by the following method. The power switch is turned on only when the user is identified as an authorized user.

1. Combination Key Switch

Example: The switch is turned on when a combination of key touches (a series of touches and a simultaneous touch, at the push position in the touch switch region matches a proper combination.

Example: The switch is turned on when a time interval (like Morse code) at the push position in the touch switch region matches a proper time interval.

2. Fingerprint Authentication Switch

Example: The switch is turned on when the fingerprint at the push position in the touch switch region matches the fingerprint of the authorized user. In this case, it is necessary to provide the touch switch region with an image read function and to provide the push position with a fingerprint reader.

3. Signature Authentication Switch

Example: The switch is turned on when the push position in the touch switch region is touched and a signature matches an authentic signature. In this case, it is necessary to provide the touch switch region or the touch panel with the image read function and to temporarily display a signature input area on the push position or a display screen.

3) System Switch Function

This function is used for the following applications in place of the switch which has been heretofore provided by the system.

1. System Power Switch

Example: The switch is repeatedly turned on and off only when two touch switch regions are simultaneously touched and pushed.

Example: This switch is combined with the security function.

2. System Suspend/Resume Switch

Example: The switch is repeatedly turned on and off only when two touch switch regions are simultaneously touched and pushed.

Example: This switch is combined with the security function.

4) S/W Key Function

This function is used in place of a command menu which has been heretofore provided by the S/W.

1. Shut Down Switch

Example: The system is shut down only when two touch switch regions are simultaneously pushed.

Next, the panel power saving function and the security function of the above-described functions will be described by taking an example of a state of an actual operation with reference to FIGS. 3 and 4. FIGS. 3A to 3E show the states of the panel power saving function. It is assumed that the touch switch regions 6-1 and 6-2 are located at two corners, i.e., the lower left corner and the lower right corner of the display area of the touch panel 3, respectively. FIG. 3A shows a normal use state. In this state, both of the display module 2 and the touch panel 3 are on. FIG. 3B shows the operation which is performed when the user does not want to use the function of the touch panel 3. In this case, two touch switch regions 6-1 and 6-2 are simultaneously touched, whereby the touch panel 3 is turned off. FIG. 3C shows a state in which the touch panel 3 is off. In this state, the display module 2 is on and only the touch panel 3 is off. Two touch switch regions 6-1 and 6-2 are always on. FIG. 3D shows the operation which is performed when the user wants to use the function of the touch panel 3. In this case, two touch switch regions 6-1 and 6-2 are again simultaneously touched, whereby the touch panel 3 is turned on. FIG. 3E shows a state in which the touch panel 3 is on. In this state, both of the display module 2 and the touch panel 3 are on. The following constitution can be also employed in order to further save the power. Not two touch switch regions but only one touch switch region is powered on, so that as soon as one on-state touch switch region is touched, the other touch switch region is turned on.

FIGS. 4A to 4E show the states of the combination key switch of the security function. It is assumed that the touch switch region 6 is located at each of four corners of the display area of the touch panel 3. FIG. 4A shows an initial state. In this state, the system is off. Also in this state, four touch switch regions 6-1 to 6-4 are on. The following constitution may be also employed in order to further save the power. At substantially the same time when one touch switch region is touched, the other three touch switch regions are turned on. FIG. 4B shows the operation which is performed when the user wants to use the system. In this case, the display module 2 and the touch panel 3 are turned on by a series of combination key switch operations. Here, a series of combination key switch operations is that first the two lower left and lower right touch switch regions 6-1 and 6-2 are simultaneously touched, then the upper right touch switch region 6-3 is touched, and then the upper left touch switch region 6-4 is touched. FIG. 4C shows a state in which the system is on. In this state, both of the display module 2 and the touch panel 3 are on. FIG. 4D shows the operation which is performed to turn off the system. In this case, the two lower left and lower right touch switch regions 6-1 and 6-2 are simultaneously touched, whereby the system, namely, the display module 2 and the touch panel 3 are turned off. FIG. 4E shows a state in which the system is off. In this state, the system, i.e., the display module 2 and the touch panel 3 are off. Of course, also in this state, four touch switch regions 6-1 to 6-4 are on. The following constitution may be also employed in order to further reduce power consumption. Only one touch switch region is kept on so that at substantially the same time when one touch switch region is touched, the other three touch switch regions are turned on.

Next, a method of forming the invisible touch switch region 6 (6-1 to 6-4) will be described with reference to FIGS. 5 and 6. (1) Overlaying another touch panel on the surface of the display module 2 or the surface of the touch panel 3 located on the surface of the display module 2, or (2) separating a part of the touch panel from the main touch panel 3 located on the surface of the display module 2 is suitably used as the method of forming the touch switch region 6 to be driven by the independent power supply for use in the present invention.

FIGS. 5A, 5B and 5C are a top view, a side view and a bottom view of the constitution of one example of the touch switch region 6 formed on the surface of the display module 2 or the touch panel 3 in the above-mentioned case (1), respectively. In the example shown in FIGS. 5A to 5C, two protruding transparent electrodes SW1-T and SW2-T and a transparent wiring w1 for connecting the transparent electrodes SW1-T and SW2-T are provided on an upper layer, 31 shown in FIG. 5A. Two protruding transparent electrodes SW1-B and SW2-B corresponding to the transparent electrodes SW1-T and SW2-T, respectively, are located on a lower layer 32 shown in FIG. 5C so that the transparent electrodes SW1-B and SW2-B may face each other at a fixed distance from each other, whereby the touch switch region 6 is formed. In this state, the upper layer 31 is touched and pushed with the fingertip or the like, whereby the transparent electrode SW1-T is brought into contact with the transparent electrode SW1-B and simultaneously the transparent electrode SW2-T is brought into contact with the transparent electrode SW2-B. Thus, the state of a switch circuit 33 is changed from on to off or from off to on.

Next, a fingerprint authentication switch function and a signature authentication switch function of the security function will be described. In order to carry out the fingerprint authentication switch function, it is necessary to provide the touch switch region 6 with the image read function. First, a predetermined touch switch region 6 is touched with the fingertip by a predetermined method, whereby a fingerprint authentication unit is turned on. Simultaneously, the fingerprint on the touch switch region 6 which is being touched is read, and the fingerprint authentication unit performs authentication to see whether or not the read fingerprint matches the previously registered fingerprint of an authorized user. When the result of authentication shows a fingerprint match, the system switch is turned on at this point of time. On the other hand, when the result of authentication shows a fingerprint mismatch, the fingerprint authentication switch is turned off and the switch provides for next switching.

In order to carry out the signature authentication switch function, it is necessary to provide the touch switch region 6 or the touch panel 3 with an image read function. First, a predetermined touch switch region 6 is touched with the fingertip or the like by a predetermined method, whereby a signature authentication unit, the display module 2, and the touch panel 3 are turned on. Simultaneously, a signature input section is displayed on the display module 2. Then, the signature inputted to the signature input section is read, and the signature authentication unit performs authentication to see whether or not the read signature matches the previously registered signature of an authorized user. When the result of authentication shows a signature match, the system switch is turned on at this point of time. On the other hand, when the result of authentication shows a signature mismatch, the signature authentication switch is turned off and the switch provides for next switching.

Next, one specific example of switching of the touch switch region 6 will be described with reference to FIG. 6.

In the example shown in FIG. 6, switches SW1 and SW2 are turned on with the touch of two touch switch regions 6, whereby a pulse is generated and thus a toggle logic 41 is changed from on to off or from off to on. Thus, various types of authentication units 42 are turned on. When authentication ends normally, a command to change the switch from on to off or from off to on is given. When authentication does not end normally, the switch is reset. The above-described method is only one example, and the use of various types of switches allows various methods.

As is apparent from the above description, according to the present invention, at least one touch switch region alone to be driven by the independent power supply can be always kept driven, and the power supplies of all the other functions can be kept off. Only when the user wants to control a predetermined function is the power supply of a predetermined function turned on and controlled with the touch of the touch switch region. Therefore, sufficient power saving can be achieved. Moreover, (1) the input for controlling a predetermined function is provided by the touch of one touch switch region or the simultaneous touch of a plurality of touch switch regions once or a plurality of times in a predetermined order; (2) the touch switch region is provided with the image read function, and at the time of a predetermined input operation, fingerprint authentication is performed simultaneously with the touch of the touch switch region; or (3) a window is displayed on the touch panel simultaneously with the touch of the touch switch region, the signature is written on the displayed window, and signature authentication is performed. Due to any one of the above (1) to (3), a third party who does not know an input order or has different fingerprint or signature cannot use the function. Thus, security can be maintained.

Having thus described the invention, it is desired to secure a Letters Patent on the following:

1. A display for a computing device having a computing device power supply and a plurality of functions comprising:
   a display area;
   at least one touch switch region formed in said display area and being responsive to a predetermined input; and
   at least one independent touch switch power supply connected to drive that at least one touch switch region independent of said computing device power supply, whereby power is supplied to said computing device and access granted to selected ones of said plurality of computing device functions only upon receipt of predetermined input at said at least one touch switch region.

2. The display according to claim 1, further comprising a first touch panel overlaid on said display area, whereby said display has an input function using said touch panel.

3. The display according to claim 2, wherein said at least one touch switch region is formed by overlaying a second touch panel on a surface of said display.

4. The display according to claim 2, wherein said touch switch region is provided with the image read function, and at the time of said predetermined input, a window is displayed on said touch panel simultaneously with the touch of said touch switch region, then a signature is written on said displayed window, and then signature authentication is performed.

5. The display according to claim 1, wherein said at least one touch switch region is formed by overlaying a first touch panel on a surface of said display.

6. The display according to claim 1, wherein said at least one touch switch region comprises four touch screen regions located at four corners of said display area of said display.

7. The display according to claim 1, wherein said redetermined input is provided by a touch of one of the at least one touch switch region.

8. The display according to claim 1, wherein said at least one touch switch region comprises a plurality of touch switch regions and wherein said predetermined input is provided by simultaneous touching of a plurality of the touch switch regions.

9. The display according to claim 1, wherein said at least one touch switch region comprises a plurality of touch switch regions and wherein said predetermined input is provided by touching a plurality of the touch switch regions a plurality of times in a predetermined order.

10. The display according to claim 1, wherein said predetermined input is provided by displaying a keying section on said touch panel with the touch of said touch switch region and then touching numbers of said keying section.

11. The display according to claim 1, wherein said touch switch region is provided with an image read function, and at the time of said predetermined input, fingerprint authentication is performed simultaneously with the touch of said touch switch region.

12. The display according to claim 1, wherein predetermined functions to be controlled include at least one of the group consisting of on-off control of a main power switch, on-off control of a display module of said display, on-off control of a function unit, on-off control of a system unit, or on-off control of said touch panel if said display has said touch panel.

13. The display according to claim 12, wherein said function unit is at least one of a fingerprint authentication unit and a signature authentication unit.

14. The display according to claim 12, wherein said system unit is one of a system power switch and a system suspend/resume switch.

15. A method for providing selective access to control at least one function of a computer having a display, a computing device power supply and a plurality of functions comprising the steps of:
   providing at least one touch screen region in said display, said at least one touch screen region being driven by at least one independent touch screen power source which is independent from the computing device power supply and being responsive to predetermined input;
   receiving input to the at least one touch screen region in said display; and
   providing access to control functions of the computer, whereby power is supplied to said computing device and access granted to selected ones of said plurality of functions only upon receipt of predetermined input to said at least one touch screen region.

16. The method according to claim 15 further comprising analyzing said input prior to providing access.

17. The method according to claim 16 wherein said analyzing comprises analyzing the fingerprint input to the at least one touch screen and comparing the fingerprint input to that of at least one authorized user.

18. The method according to claim 16 further comprising receiving signature input to the display and wherein said analyzing comprises comparing the signature input to that of at least one authorized user.

19. The method of according to claim 15 wherein said providing comprises overlaying at least one touch screen having at least one touch switch region on the display.

20. A program storage device readable by machine, tangibly embodying a program of instructions executable by the machine to perform the method steps for providing selective access to control at least one function of a computer having a display, a computing device power supply and a plurality of functions with at least one touch screen region in said display, said at least one touch screen region being driven by at least one independent touch screen power source, which is independent from the computing device power supply, and being responsive to predetermined input, the method comprising the steps of:

receiving input to the at least one touch screen region in said display; and providing access to control functions of the computer, whereby power is supplied to said computing device and access granted to selected ones of said plurality of functions only upon receipt of predetermined input to said at least one touch screen region.

* * * * *